Sept. 14, 1954

R. J. BROOKS 2,688,935

CONVEYER SYSTEM

Filed May 29, 1951

INVENTOR
ROBERT JOHN BROOKS
By:
Haseltine, Lake & Co.
AGENTS

Sept. 14, 1954 R. J. BROOKS 2,688,935
CONVEYER SYSTEM
Filed May 29, 1951 4 Sheets-Sheet 2
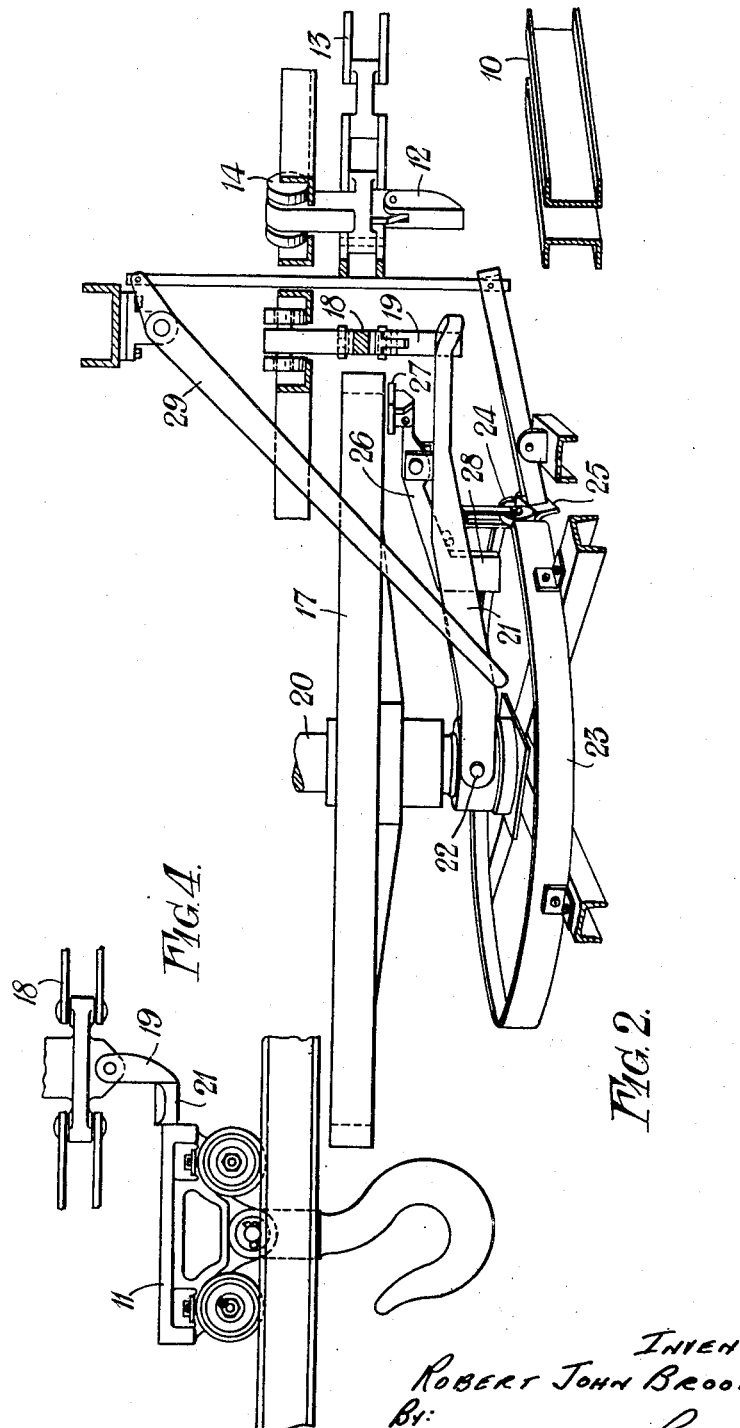
INVENTOR
ROBERT JOHN BROOKS
BY:
Haseltine, Lake & Co.
AGENTS Sept. 14, 1954  R. J. BROOKS  2,688,935
CONVEYER SYSTEM
Filed May 29, 1951  4 Sheets-Sheet 3
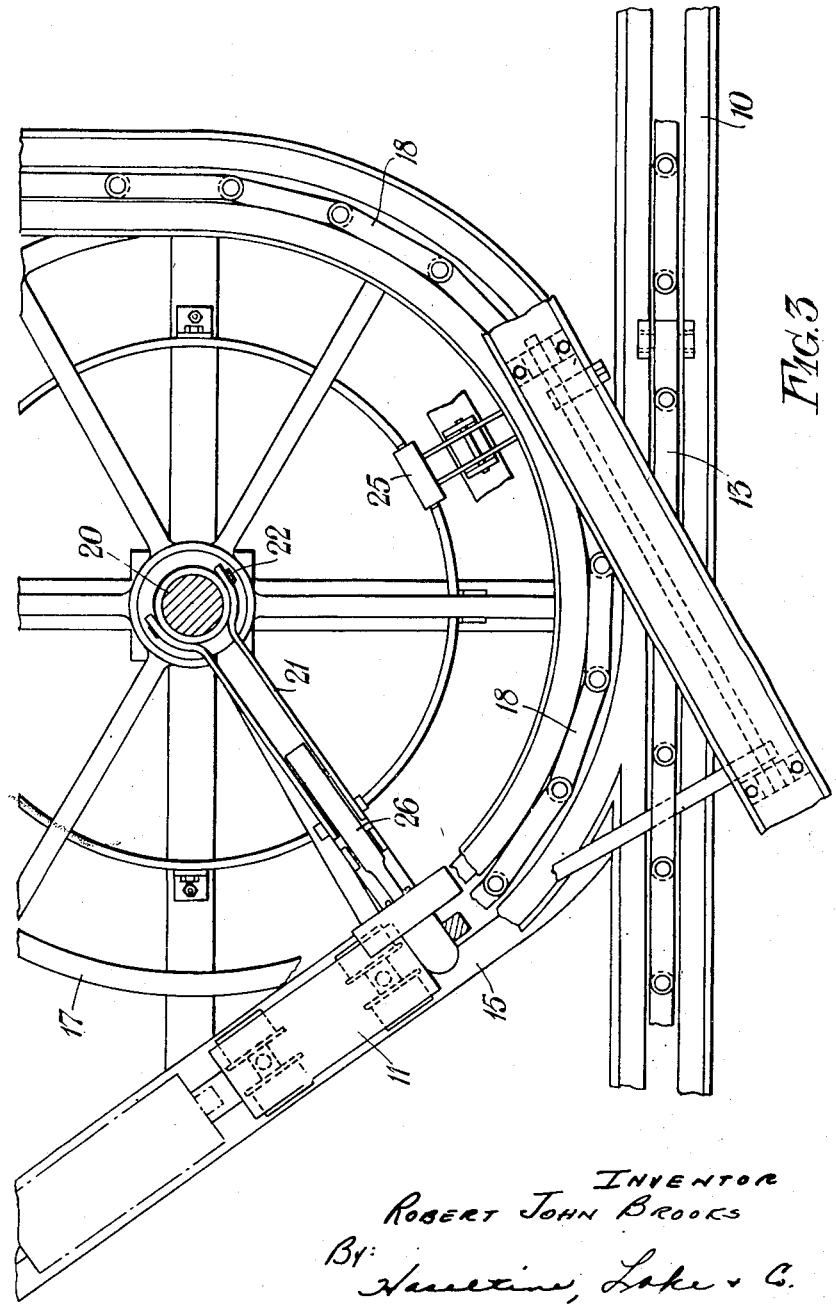

Sept. 14, 1954　　　　R. J. BROOKS　　　　2,688,935
CONVEYER SYSTEM
Filed May 29, 1951　　　　　　　　　　　　4 Sheets-Sheet 4

INVENTOR
ROBERT JOHN BROOKS
BY:
Valentine, Lake & Co.
AGENTS

Patented Sept. 14, 1954

2,688,935

UNITED STATES PATENT OFFICE 2,688,935

CONVEYER SYSTEM

Robert John Brooks, Hitchin, England, assignor to Geo. W. King Limited, Hitchin, England, a British company Application May 29, 1951, Serial No. 228,900

Claims priority, application Great Britain June 1, 1950

7 Claims. (Cl. 104—104)

This invention relates to conveyor systems of the type wherein load carrying trolleys are propelled along a track by virtue of the engagement therewith of pusher dogs or driving abutments carried by a driving chain which is itself suspended from trolleys adapted to run on a second track disposed above that on which the load carrying trolleys are caused to run.

It is the chief object of the invention to provide a transfer mechanism adapted to transfer load carrying trollies from one conveyor of the type set forth to a second of similar type, the two conveyors being disposed in proximity to each other at one point and there being a connection between the respective tracks which support the load carrying trollies.

According to the invention in a conveyor system wherein two conveyors of the type set forth are so arranged as to be in proximity to each other at one point, there being a connection between the tracks for the load carrying trollies so that the latter may pass from one conveyor to the other, a transfer mechanism is provided which includes means operable automatically on the passage of a trolley from the track of the first conveyor to that of the second so that as said trolley passes out of contact with a pusher dog on the driving chain of the first conveyor it will be positively propelled into a position wherein it will be engaged directly by a pusher dog carried by the driving chain of the second conveyor.

Preferably the arrangement is such that the driving chain of one conveyor is caused to pass around a terminal or a corner chain wheel of known type which is conveniently disposed in relation to the junction between the two conveyors and an arm or the like is provided which is capable of an angular motion about a fixed vertical axis while also being capable of a pivotal movement about a horizontal axis, means also being provided which are operative on switching of a trolley from one conveyor to the other to cause the arm or the like to be coupled to the chain wheel and to be moved angularly thereby into a position to engage the trolley and simultaneously to lie in the path of the pusher dogs or driving abutments carried by the driving chain of the second conveyor so that a drive will be transmitted to the trolley from one of said dogs or abutments via the arm or the like until such time as said trolley is moved sufficiently along the second conveyor to be driven directly by said dog or abutment whereupon the arm or the like is withdrawn and returned to its inoperative position.

In order that the said invention may be clearly understood and readily carried into effect the same will now be more fully described with reference to the accompanying drawings in which:

Figure 2 is a side elevational view of the mechanism shown in Figure 1;

Figure 3 is a plan view similar to that shown in Figure 1 but showing the mechanism at one stage during the operation thereof;

Figure 4 is a side elevational view of a detail;

Figure 1:
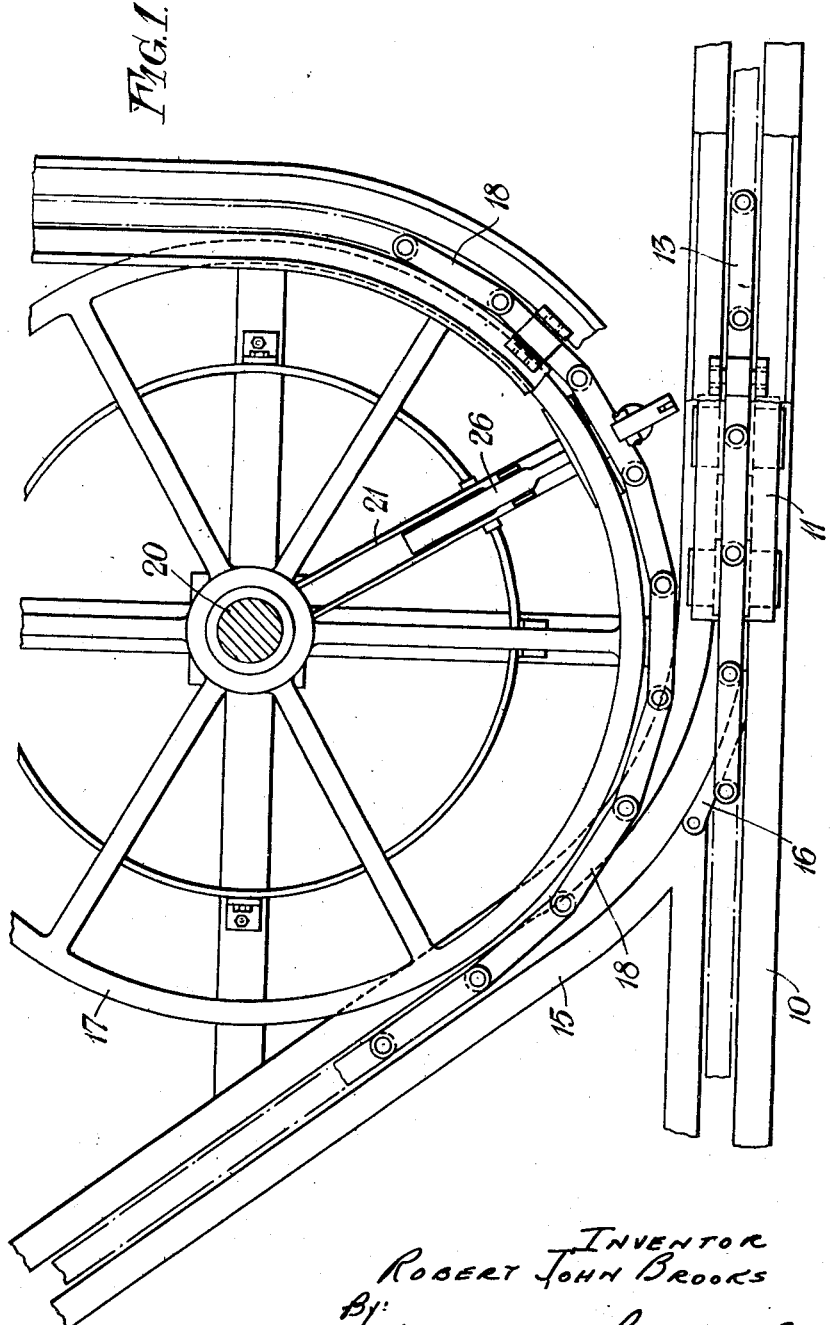
Figure 1 is a plan view of a transfer mechanism when in the inoperative position, certain parts of the mechanism having been omitted to permit of better illustration.
Figure 5:
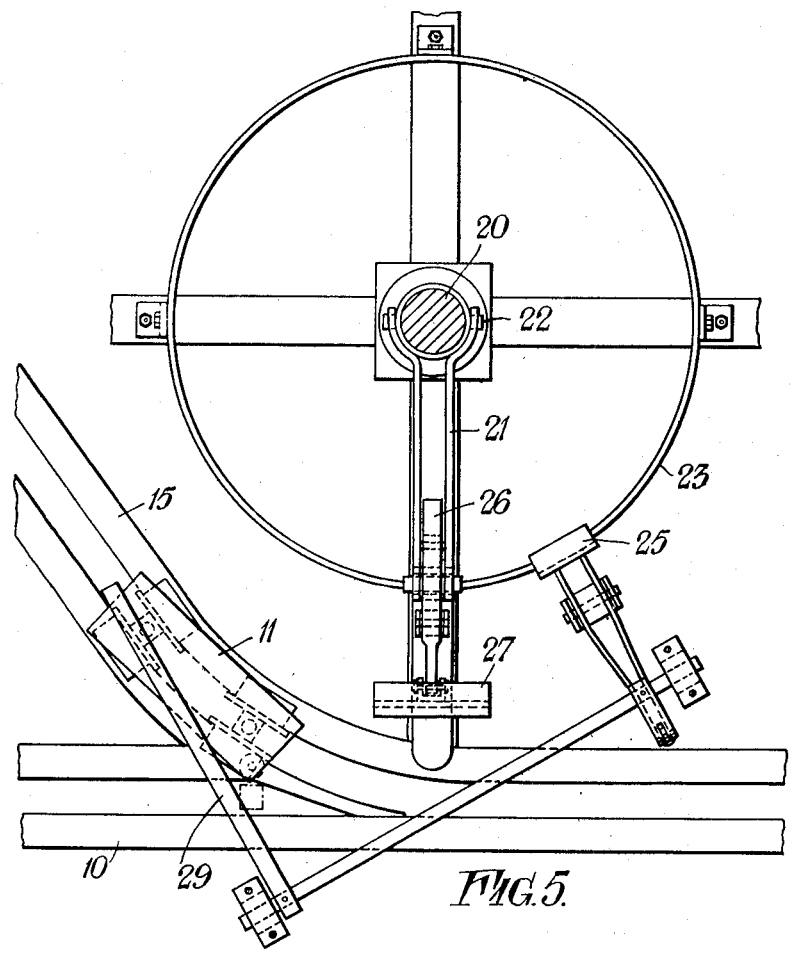
Figure 5 is a plan view similar to that shown in Figures 1 and 3 but with the corner chain wheel of the branch conveyor omitted and showing the mechanism in a position intermediate that of Figures 1 and 3.

Referring now to the drawings, 10 denotes the track of a main conveyor along which load carrying trolleys one of which is indicated at 11, are adapted to run, said trolleys being propelled by means of pusher dogs or driving abutments 12 carried by a driving chain 13 which is suspended from trolleys 14 adapted to run on a second track, hereinafter termed the "chain track," disposed above the track 10. At a selected point in the track 10 a branch load carrying trolley track 15 is provided, the load trolleys being switched from the main track to said branch track when required through the medium of a pivoted switch tongue or the like 16 of known type which is operable in any convenient manner.

Disposed at a convenient point adjacent the junction of the main and branch tracks 10 and 15 is a chain wheel 17 which is rotatable about a vertical axis. The chain wheel 17 is adapted to provide a corner or terminal wheel around which a second driving chain 18 is adapted to pass, said second chain having pusher dogs or the like 19 associated therewith and being so disposed that after passing around said wheel one run or flight thereof will be caused to travel in a path above the branch track 15 so that load carrying trolleys diverted on to said branch track may be driven therealong.

Freely mounted on the shaft 20 carrying the chain wheel 17 is an arm 21 which projects radially with respect to said shaft and is of such a length that it will bridge the centres of the chains both in the main and subsidiary conveyors. In addition to being freely rotatable about the aforesaid shaft the arm is capable of a pivotal movement about a horizontal axis 22, i. e. it is capable of being swung upwardly or downwardly while being also rotatable about said shaft. Disposed concentrically with respect to the shaft is a circular track 23 on which a roller 24 associated with the arm 21 is adapted to run, the roller serving thus to support said arm while allowing free rotational movement thereof. The circular track 23 includes a movable section 25 which is capable of being raised and lowered with respect to the remainder of the track, the arrangement being such that vertical movement of said section will result in a corresponding vertical movement of the arm 21.

The arrangement is such that normally the movable section 25 will be disposed below the level of the circular track 23 as shown in Figure 2 being adapted on actuation to be moved up into a position where it is in alignment with and forms a part of said track.

Pivotally mounted on the arm 21 is a lever 26 carrying a friction pad or the like 27 the arrangement being such that with said arm in its uppermost position (i. e. when the roller 24 associated therewith is running on the circular track 23 and is in rolling contact with the movable section 25 when in its uppermost position), the friction pad will be caused to bear against the undersurface of the chain wheel 17. As indicated above, the chain wheel 17 is caused to rotate by virtue of the passage therearound of the second chain 18 to which latter a drive is imparted in any suitable manner and the arrangement is therefore such that when the friction pad 27 is brought into engagement with said wheel a drive will also be imparted to said arm 21. In order to provide the necessary pressure on the lever to allow of the provision of a satisfactory friction drive said lever is provided with a suitable counterweight 28. The mechanism above described is adapted to operate as follows:

Prior to operation, i. e. when the mechanism is inoperative as shown in Figures 1 and 2 and the load carrying trolleys are all propelled along the main conveyor track 10, the roller 24 associated with the arm 21 will be in engagement with the movable section 25 of the circular track 23 which section is then in its lowermost position so that the arm 21 will correspondingly be in its lowermost position with the result that the friction pad 27 will be out of engagement with the chain wheel 17.

Upon switching of a load carrying trolley 11 from the main track 10 to the branch track 15, the mechanism will be brought into operation. As soon as the trolley 11 leaves the main track it is adapted to contact a lever 29 which is operatively connected to the movable section 25 of the circular track 23 and is adapted on operation to effect raising of said section. Power for operation of the aforesaid lever 29 is derived from the pusher dog or driving abutment 12 which was in engagement with the trolley 11 when on the main conveyor 10. Raising of the section 25 in turn causes lifting of the arm 21 and lever 26 and engagement of the friction pad 27 with the chain wheel 17 around which the second chain 18 passes. On such engagement of the friction pad 27 the arm 21 will be caused to move about the axis of the chain wheel shaft 20 and will be caused to abut against the load carrying trolley 11 which by that time is clear of the pusher dog or driving abutment 12 on the main conveyor chain 13. Upon abutment of the arm 21 with the trolley 11 the friction grip between the pad 27 and the chain wheel 21 will be overcome and the wheel will slide over said pad. The arrangement is such, however, that when in position abutting the trolley 11 the arm 21 itself will be engaged by a pusher dog or driving abutment 19 on the second driving chain 18 as shown in Figure 4 and by virtue of the movement of such chain a drive will be imparted via the dog or abutment 19 and the arm 21 to said trolley to move the same along the branch track. Due to the fact that the arm 21 rotates about the axis of the chain wheel shaft 20 it will during a predetermined rotational movement be gradually retracted from its position behind the trolley 11, which latter will eventually be driven by virtue of the direct contact of the pusher dog or driving abutment 19 therewith. In order to allow for a smooth take over as the arm 21 recedes from its position between the dog or abutment 19 and the trolley 11, said arm is suitably curved at its outer end. When the arm 21 leaves the trolley 11 and the drive to the latter is taken over directly by the dog 19, the friction drive will again be operative causing the arm 21 to rotate about the axis of the chain wheel shaft 20. Finally the arm 21 will be moved around until it reaches its initial position wherein the roller 24 associated therewith will be in engagement with the movable section 25 and with such section in its lowermost position the arm 21 will be lowered to bring the friction pad 27 out of engagement with the chain wheel 17 so that the cycle of operation will be completed and the mechanism will again be in a position of rest ready for further operation.

I claim:

1. In a conveyor system including a main track and at least one branch track along which load carrying trolleys are adapted to travel, a switch device whereby such trolleys may be diverted from said main track to the branch track and endless driving chains disposed one above each of said main and branch tracks, said driving chains being in spaced, horizontal relation at the confluence of the main and branch tracks and carrying depending pusher dogs adapted to engage and to propel the load carrying trolleys along the respective tracks, the provision of a transfer mechanism disposed at the confluence of the main and branch tracks to move the trolleys across the space between the driving chains, such mechanism comprising a transfer arm movable angularly about a vertical axis disposed adjacent the confluence of the tracks, said arm having a normal inoperative lowered position and being raisable about a horizontal axis to an operative position to be moved on said vertical axis, said arm being of such a length as to be capable, when raised to an operative position, of bridging the centres of the driving chains both in the main and branch tracks, and means adapted on switching of a trolley from said main track to the branch track to cause said arm to be raised to an operative position and thereafter move on its vertical axis to push such trolley across the space of the driving chains and into position beneath the driving chain of the branch track to thereafter be engaged and propelled by a pusher dog on the driving chain of the branch track.

2. In a conveyor system including a main track and at least one branch track along which load carrying trolleys are adapted to travel, a switch device whereby such trolleys may be diverted from said main track to the branch track and endless driving chains disposed one above said main and branch tracks, each of said driving chains being in spaced horizontal relation at the confluence of the main and branch tracks and carrying depending pusher dogs adapted to engage and to propel the load carrying trolleys along the respective tracks, the provision of a transfer mechanism disposed at the confluence of the main and branch tracks to move the trolleys across the space between the driving chains, such mechanism comprising a corner wheel around which the driving chain for the branch track passes, said wheel being disposed adjacent the confluence of the main and branch tracks and rotatable about a vertical axis, a transfer arm movable angularly about the axis of rotation of said wheel and movable about a horizontal axis from a lower inoperative position to a raised operative position, means for coupling said arm to said wheel when it has been raised to thereafter move angularly therewith, and means adapted, on switching of a trolley from said main track to the branch track, to raise said arm to render said first-mentioned means effective to couple said arm to said wheel and thereby to cause the arm to move angularly into engagement with the trolley and also into the path of a pusher dog on the driving chain of the branch track, whereafter due to the action of said latter driving chain, said arm will be caused to propel the trolley along the branch track until said trolley reaches a point whereat the pusher dog is itself in position to engage and to propel the same.

3. In a conveyor system including a main track and at least one branch track along which load carrying trolleys are adapted to travel, a switch device whereby such trolleys may be diverted from said main track to the branch track and endless driving chains disposed one above said main and branch tracks, each of said driving chains being in spaced, horizontal relation at the confluence of the main and branch tracks and carrying depending pusher dogs adapted to engage and to propel the load carrying trolleys along the respective tracks, the provision of a transfer mechanism disposed at the confluence of the main and branch tracks to move the trolleys across the space between the driving chains, such mechanism comprising a corner wheel around which the driving chain for the branch track passes, said wheel being disposed adjacent the confluence of the tracks and rotatable about a vertical axis, a transfer arm movable angularly about the axis of rotation of said wheel and movable about a horizontal axis from a lower inoperative position, friction means on said arm and engageable with said wheel when said arm is raised from its lower inoperative position to cause said arm to move angularly with said wheel into engagement with the trolley and also into the path of a pusher dog on the driving chain of the branch track, whereafter due to the action of said latter driving chain, said arm will be caused to propel the trolley along the branch track until said trolley reaches a point whereat the pusher dog is itself in position to engage and propel the same, and means controlled by the trolley as it moves from the the main track to the branch track to raise said arm to its operative position.

4. In a conveyor system including a main track and at least one branch track along which load carrying trolleys are adapted to travel, a switch device whereby such trolleys may be diverted from said main track to the branch track and endless driving chains disposed one above said main and branch tracks, each of said driving chains being in spaced horizontal relation at the confluence of the main and branch tracks and carrying depending pusher dogs adapted to engage and to propel the load carrying trolleys along the respective tracks, the provision of a transfer mechanism disposed at the confluence of the main and branch tracks to move the trolleys across the space between the driving chains, such mechanism comprising a corner wheel around which the driving chain for the branch track passes, said wheel being rotatable about a vertical axis disposed adjacent the confluence of the tracks, a normally inoperative transfer arm movable angularly about the axis of rotation of said wheel and pivotally supported for movement about a horizontal axis to be raised to an inoperative position, friction means on said arm and adapted on pivotal movement of the latter to engage said wheel thereby to cause an angular movement to be imparted to said arm, and means adapted on switching of a trolley from the main track to the branch track to effect pivotal movement of said arm about its horizontal axis, thereby to cause the friction means to engage said wheel and to cause the arm to move angularly with the latter into engagement with the trolley and also into the path of a pusher dog in the driving chain of the branch track, whereafter due to the action of said latter driving chain, said arm will be caused to propel the trolley along the branch track until said trolley reaches a point whereat the pusher dog is itself in position to engage and propel the same, said means for effecting pivotal movement of said arm being normally inoperative so that when said arm completes one revolution with said wheel it is free to drop back to its inoperative position.

5. In a conveyor system including a main track and at least one branch track along which load carrying trolleys are adapted to travel, a switch device whereby such trolleys may be diverted from said main track to the branch track and endless driving chains disposed one above each of said main and branch tracks, said driving chains being in spaced, horizontal relation at the confluence of the main and branch tracks and carrying depending pusher dogs adapted to engage and to propel the load carrying trolleys along the respective tracks, the provision of a transfer mechanism disposed at the confluence of the main and branch tracks to move the trolleys across the space between the driving chains, such mechanism comprising a corner wheel around which the driving chain of the branch track passes, said wheel being adapted to rotate about a vertical axis disposed adjacent the confluence of the tracks, a normally inoperative transfer arm movable angularly about the axis of rotation of said wheel and pivotally supported for movement about a horizontal axis to be raised to an operative position, a follower on said arm, a circular track beneath a concentric with said wheel with which the follower is adapted to co-operate, a movable section incorporated in said track and adapted normally to assume a depressed position in relation thereto, said follower being normally in engagement with said movable section of the track, friction means on said arm, and adapted on pivotal movement of the latter to engage the wheel, thereby to cause an angular movement to be imparted to said arm, and means adapted on switching of a trolley from the main to the branch track to effect raising of said movable section of the circular track thereby to effect pivotal movement of the arm about its horizontal axis sufficient to cause the friction means to engage said wheel and to cause the arm to move angularly with the latter into engagement with the trolley and also into the path of a pusher dog in the driving chain of the branch track, whereafter, due to the action of said latter driving chain, said arm will be caused to propel the trolley along the branch track until said trolley reaches a point whereat the pusher dog is itself in position to engage and propel the same, said movable section being normally in a lowered position so that when said arm completes a revolution on said track said follower will drop onto said movable section back to its inoperative lowered position.

6. A transfer mechanism as in claim 5, in which the means include a pivoted lever disposed in the path of any trolley passing from the main track to the branch track, said lever being coupled to the movable section of the circular track so that on passage of a trolley the lever will be pivoted to raise the movable section which in turn raises the transfer arm, said section returning to its initial position when the trolley moves out of contact with the lever.

7. A transfer mechanism as in claim 5, in which the friction means comprise a lever pivotally mounted on the arm, a friction pad carried by said lever, and means on the lever to counterweight the friction pad in order to ensure the requisite frictional engagement between the friction pad and the corner wheel.

References Cited in the file of this patent

UNITED STATES PATENTS

| Number | Name | Date |
|---|---|---|
| 2,527,244 | Culver | Oct. 24, 1950 |